April 30, 1968   A. SCHOELLER   3,380,616
BOTTLE CRATE OF PLASTIC MATERIAL
Filed Dec. 17, 1962   6 Sheets-Sheet 1

Inventor:
Alexander Schoeller

April 30, 1968  A. SCHOELLER  3,380,616
BOTTLE CRATE OF PLASTIC MATERIAL
Filed Dec. 17, 1962  6 Sheets-Sheet 2

Inventor:
Alexander Schoeller

April 30, 1968  A. SCHOELLER  3,380,616
BOTTLE CRATE OF PLASTIC MATERIAL
Filed Dec. 17, 1962  6 Sheets-Sheet 3

Inventor:
Alexander Schoeller

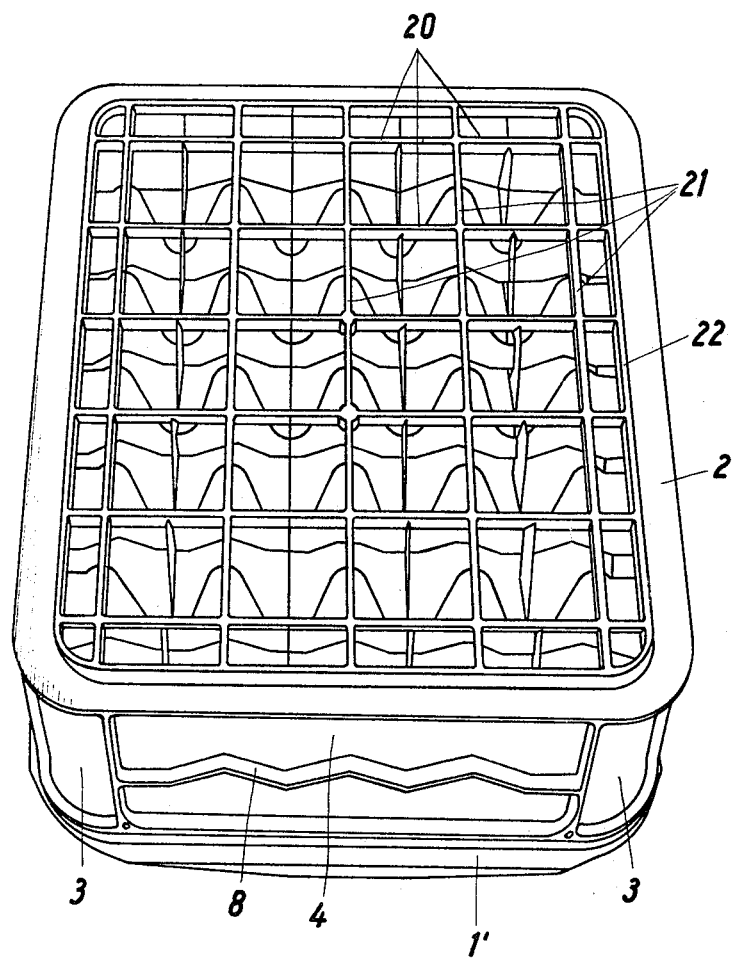

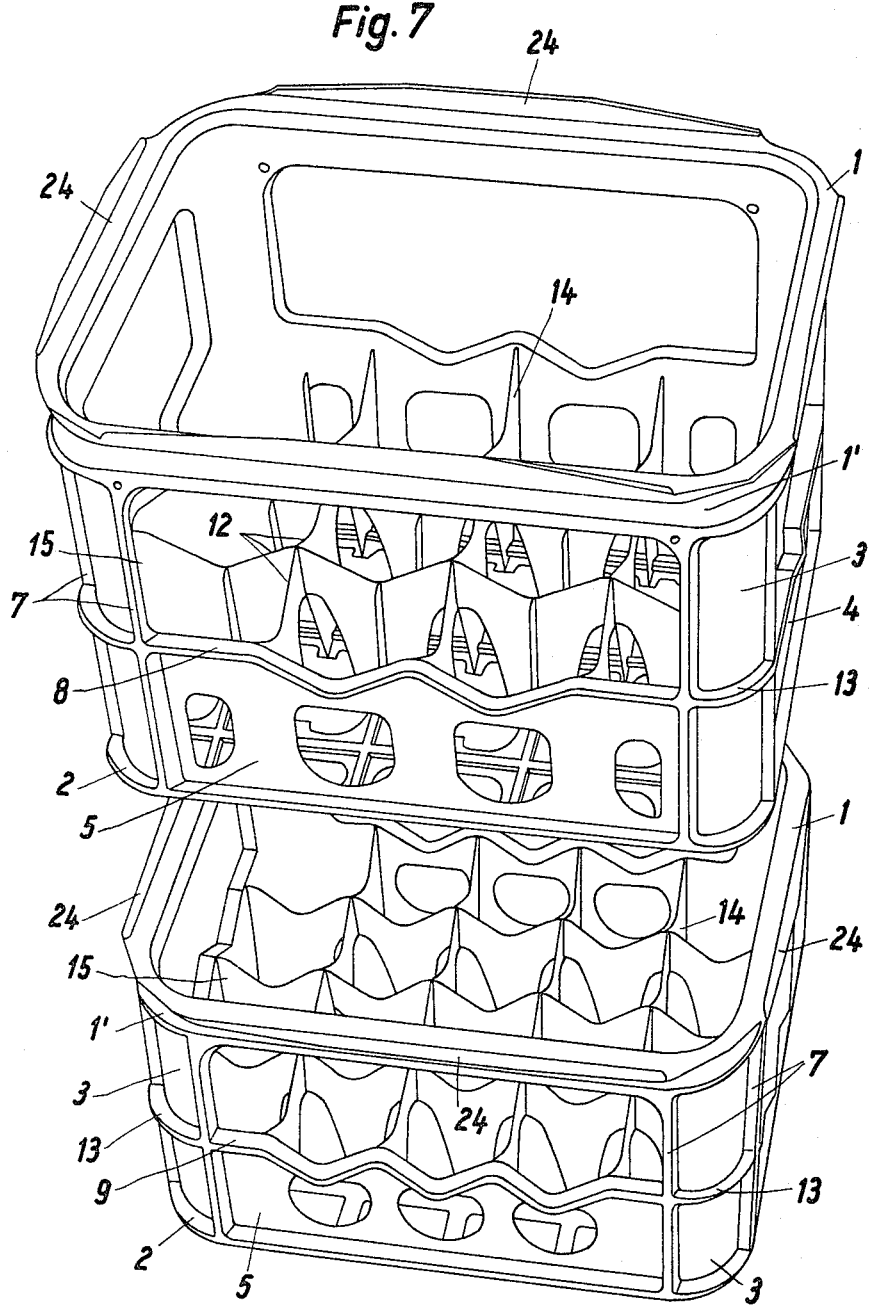

April 30, 1968     A. SCHOELLER     3,380,616
BOTTLE CRATE OF PLASTIC MATERIAL
Filed Dec. 17, 1962     6 Sheets-Sheet 6
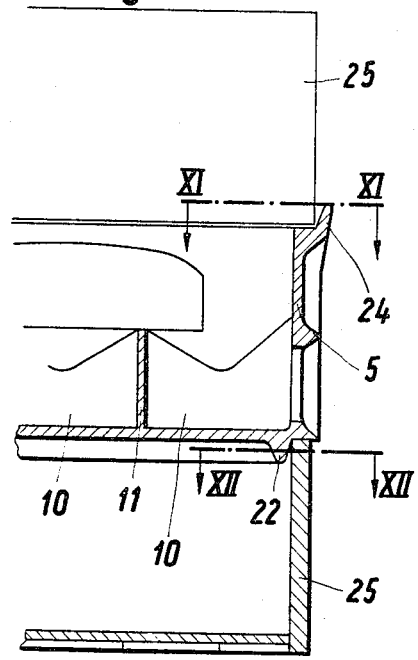
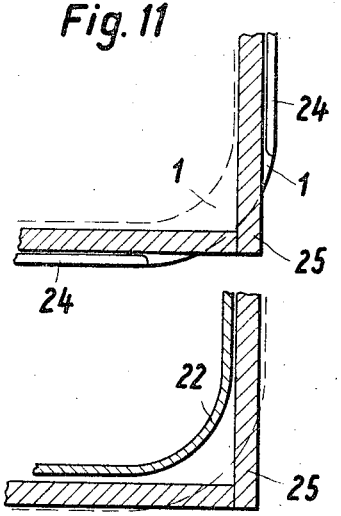
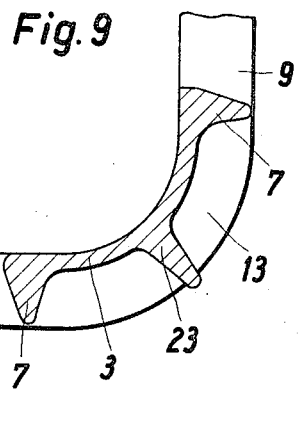
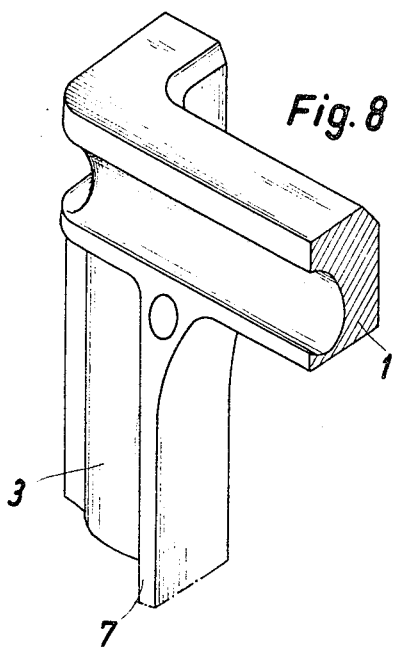
Inventor:
Alexander Schoeller
By Ernest G. Montague
Attorney

United States Patent Office 3,380,616
Patented Apr. 30, 1968

3,380,616
BOTTLE CRATE OF PLASTIC MATERIAL
Alexander Schoeller, Flugplatz, Gottingen, Germany
Filed Dec. 17, 1962, Ser. No. 245,112
3 Claims. (Cl. 220—21)

The present invention relates to a crate made of plastic material for bottles of any kind, especially for bottles containing beverage, as beer, lemonade, milk, Coca-Cola, or the like, having longitudinal and transverse walls inside forming a framework and securing the bottles in position, the framework being an integral part of the crate.

Known crates of this type have various disadvantages. Either, they are not strong enough or they cannot be handled with ease, or it is difficult to put the bottles in place. Another disadvantage resides in the fact that they are difficult to clean and that liquid, as for instance condensed water or the like, could not escape.

It is one object of the present invention to provide a bottle crate of plastic material, which eliminates these deficiencies by providing a bottle crate which is of sturdy design, easy to handle and easy to clean. Material requirements for its production are small. It is another advantage that it can be piled together with all other types of bottle crates, as for instance with crates made of wood or metal.

It is another object of the present invention to provide a bottle crate of plastic material, which comprises a stiff upper frame and a rigid bottom frame which are rigidly connected with each other by means of corner supports rounded on the outside and which have walls provided between them in the lower part of the crate, the walls enclosing a framework between them. The frames, the corner supports, and the upper flange of the side walls are provided with reinforcing ribs which project to the outside, and the bottom frame carries a grid of profiled bars forming the crate bottom on which the framework is placed.

It is still another object of the present invention to provide a bottle crate of plastic material, wherein the upper edges of the framework walls are raised at the points of intersection to form guide edges for guiding the bottles into the various compartments. Conveniently, the upper edges of the side walls, too, are staggered or curved to correspond with the framework shape. On the other hand, the points of intersection of the framework are formed like a truncated cone or are cut off to limit the height of the framework and thus material requirements.

It is also another object of the present invention to provide a bottle crate of plastic material, wherein, in order to increase the stiffness of the side walls, all or some of the framework walls are raised near the side walls towards their upper edge. The crate side walls may have openings so that the bottle labels can be seen or they may be plain and unbroken for the attachment of labels, pictures, or the like.

It is further object of the present invention to provide a bottle crate of plastic material, wherein, in order to facilitate the insertion and removal of the bottles, the inside of the crate is widened above the framework and provided with guide surfaces directed towards the framework at the points of intersection.

The cleaning of the crate and the outlet of liquid is facilitated in that according to the invention the longitudinal and the transverse walls of the framework near the points of intersection are cut so that triangular wall parts remain in the various compartments which extend downward and enclose the profiled bars of the bottom grid, which walls are connected with each other only at the upper framework side. This design enables a considerable saving of material.

It is still a further object of the present invention to provide a bottle crate of plastic material, wherein, in order to enable or facilitate piling of the crates, the crate bottom is provided with a flange projecting downwards which with its outer dimensions fits into the inside of the upper crate part, while on the upper crate side a flange is provided projecting upwards and having recesses near the rounded crate corners to enclose a crate placed on top of it.

To increase the stability of the crate, auxiliary ribs may be provided on the corner supports above the framework which project to the outside and which are curved on their outside.

With these and other objects in view, which will become apparent in the following detailed description, the present invention will be clearly understood in connection with the accompanying drawings, in which:

FIG. 4 is a bottom perspective view of the crate disclosed in FIG. 3;

FIG. 6 is a fragmentary sectional view of the crate disclosed in FIG. 2, on an enlarged scale;

FIG. 7 is a perspective view of two crates being in superposed position;

FIG. 8 is a fragmentary perspective view of a corner of the crate disclosed in FIG. 2;

FIG. 9 is a fragmentary sectional view of a corner support used in a crate disclosed in FIG. 2;

Figure 1:
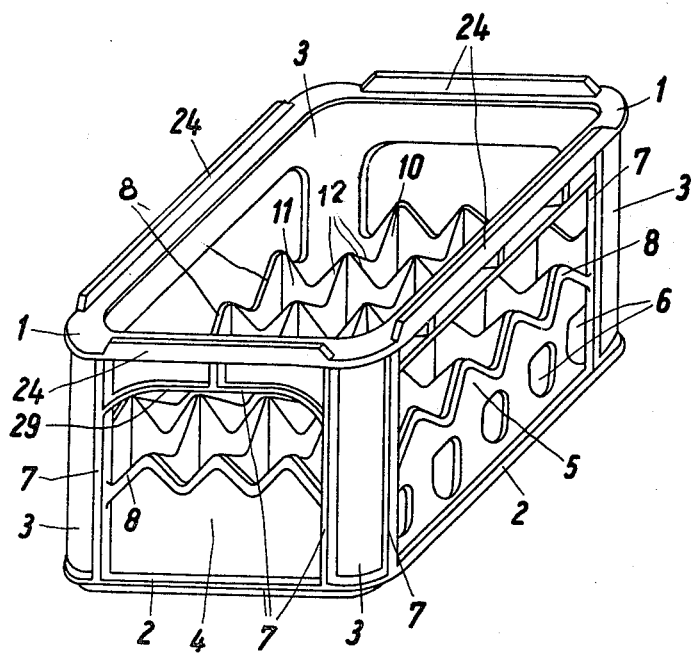
FIGURES 1 to 3 are perspective views of different embodiments of bottle crates.

FIG. 10 is a fragmentary sectional view of a plurality of crates, disposed in superposition; and FIGS. 11 and 12 are sectional views along the lines 11—11 and 12—12 of FIG. 10.

Referring now to the drawings, the basic structure of all crates is the same. A stiff top frame 1 is rigidly connected with a stiff bottom frame 2 by means of corner supports 3 which are rounded on the outside. Outer walls 4 and 5 are provided between the corner supports and in the lower part of the crate, the walls 5 having openings 6, so that the labels on the bottles can be seen through the openings 6 from outside. The side walls 4 are plain to allow for the attachment of labels, pictures, or the like. It is of no importance whether the long walls 5 of the crate are provided with openings as in the embodiment shown in FIG. 1, or whether they are plain and unbroken as in FIG. 2.

On both sides, the corner supports 3 are provided with a reinforcing flange 7 extending from the top to the bottom. At their upper end, the side walls 4 and 5, too, have a reinforcing flange 8 and 9, respectively. Since the upper side of the crate on its greater part is unobstructed, it can well be used as a handle. In the embodiment shown in FIG. 1, the front sides of the crate are shaped like an arch 29, while in the embodiment of the crate illustrated in FIGS. 2 and 3 the upper edge of the crate is formed of a profile 1' which in itself is rigid and rounded so that it can be seized at all four sides of the crate.

Inside the lower part of the crate there are longitudinal walls 10 and transverse walls 11 intersecting each other and forming a framework. At the points of intersection of the walls, the latter are raised somewhat as can be seen in FIGS. 1 to 3, so that in this manner guiding edges 12 are formed on the upper side of the framework, which guiding edges 12 are inclined towards the bottom and which enable the bottles to be safely put into the compartments.

Figure 3:
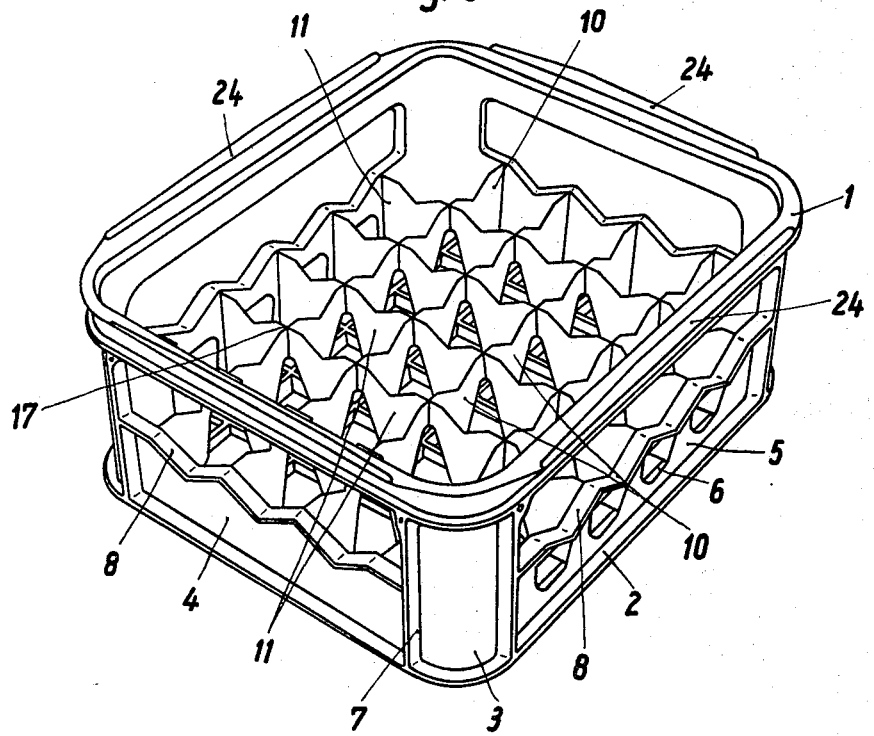

In the embodiment of the crate shown in FIGS. 1 and 3, the upper rims 8 of the side walls 4 and 5 are staggered or curved in accordance with the shape of the framework, so that bottles which are accidentally placed on the outer wall are correctly guided into a compartment.

Figure 2:
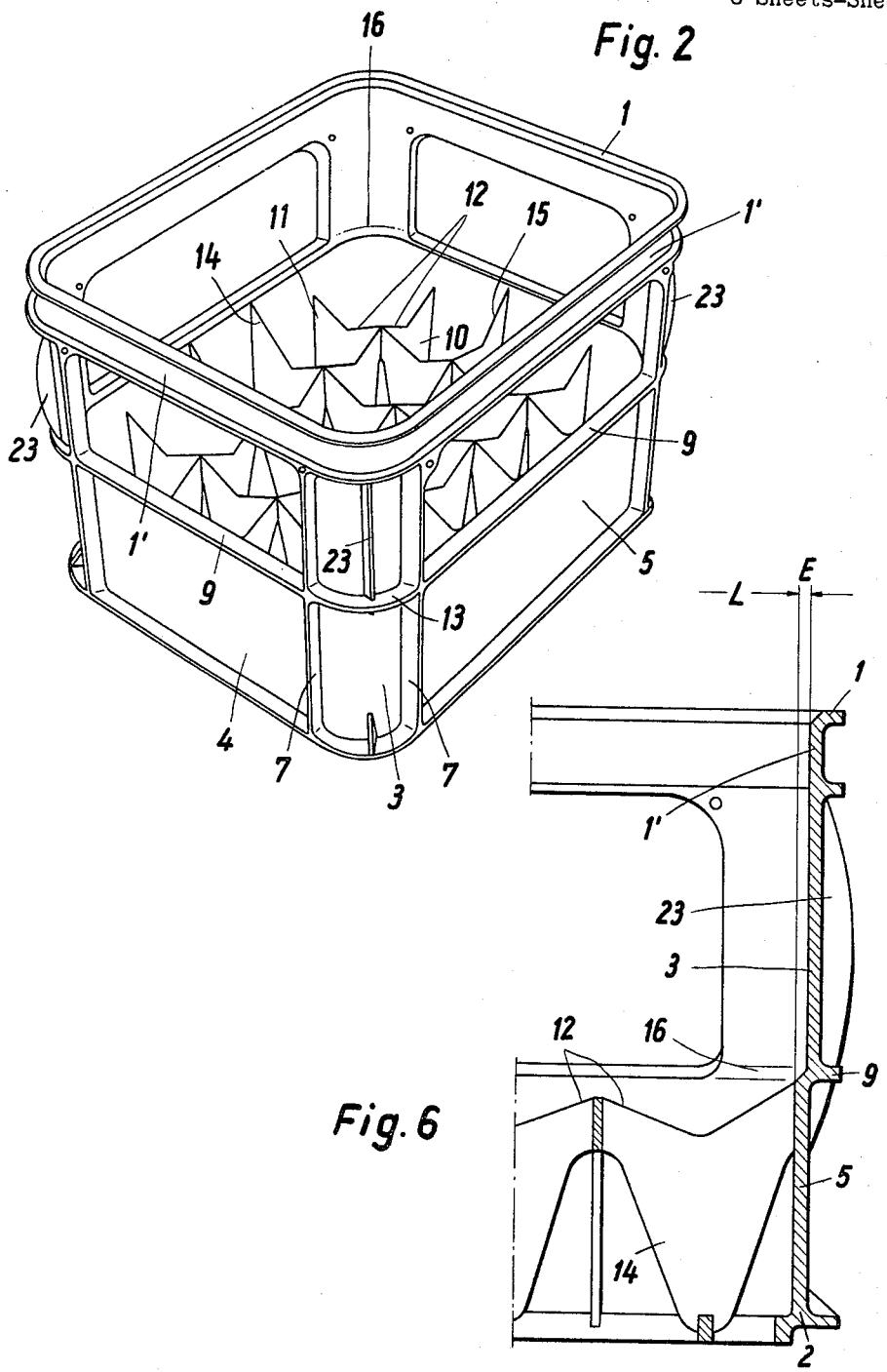

In the embodiment of the crate shown in FIG. 2, the side walls 4 and 5 are limited by a straight stiff upper flange 9 which is also continued across the corner supports 3 in the form of a projecting flange 13. To reinforce the side walls 4 and 5, some of the inner walls 10 and 11 are raised to the upper rim of the outer wall inside the crate, as at 14 and 15.

The crate, as disclosed in FIG. 2, shows another advantage insofar as the inside of the upper part of the crate is widened above the framework. The amount of widening can be seen from FIG. 6. The inside dimensions of the bottom part of the crate are equal to L. The widening of the upper part of the crate equals E.

At the point where the widened upper part of the crate ends in the lower part of the crate, a rib 9 is provided on the outside and a sloping guide surface 16 on the inside, so that bottles, put in from above cannot be set on any projecting rim.

Figure 5:
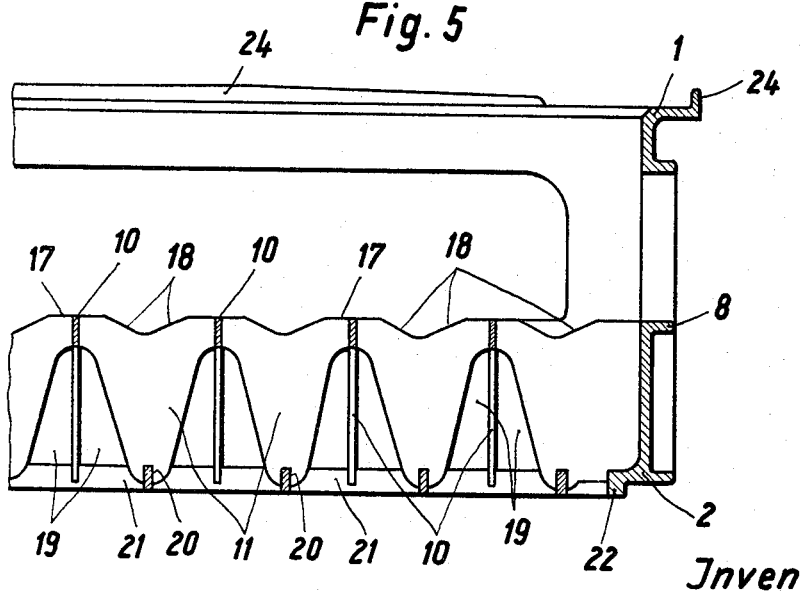
FIG. 5 is a fragmentary sectional view of the crate disclosed in FIG. 3, on an enlarged scale.

In the crate illustrated in FIGS. 3 to 5, the longitudinal and the transverse walls 10 and 11 forming the framework are cut off at the points of intersection, so that guide edges 18 sloping towards the bottom remain in the center of each compartment. Furthermore, the walls 10 and 11 are cut out approximately in the form of a triangle as at 19, from close below the upper edge down to the bottom so that only triangular wall parts remain which at their lower end enclose profiled bars 20 and 21 forming the bottom grid. This grid 20, 21 can be clearly seen in FIG. 4. It consists of bars of rectangular section and is enclosed by a bottom flange 22 projecting downwards. The points of intersection in the bottom grid 20 and 21 are approximately in the center of each compartment, so that the bottle contained in the compartment is safely supported on the grid intersection. Liquid can escape through the bottom openings. The upright, rectangular shape of the grid bars 20 and 21 stiffens the crate bottom.

To prevent the corner supports 3 from being bent to the outside under severe load, auxiliary reinforcing ribs 23 are provided at the corners in the upper part of the crate (see also FIGS. 2, 6, and 9) which are rounded on their outside according to the load. By means of these ribs 33 the upper part of the corner supports 3 which is subjected to severe loads, is considerably reinforced.

A crate in accordance with the present invention can be piled together with crates of different design. According to the size of the bottles, the different crates contain a certain type of number of bottles. This determines the inside dimensions of the crate. In the crate according to the present invention, the outer dimensions of the bottom flange 22 are designed, so that it fits into the inside of the upper crate flange 1. The bottom flange 2 of each crate is enclosed by upright flanges 24 of the crate top frame (FIG. 1). To enable rectangular bottle crates 25 of wood, metal, or the like to be piled one on the other, the flanges 24 are recessed or interrupted near the rounded crate corners or corner supports, as can be seen from FIG. 1. The crate in FIGS. 3 to 5 also shows the same design of the upper flange.

FIGS. 10 to 12 show the piling of the crates, a plastic crate designed in accordance with the present invention being piled on a rectangular wooden crate 25. The bottom flange 22 fits into the inside of the wooden crate 25, as shown in FIG. 12. The rectangular bottle crate 25 placed on top fits between the upright flange 24, as shown in FIG. 11, the corners of the crate projecting beyond the recesses of the flange 24, i.e. beyond the round corners.

FIG. 7 shows the piling of crates in accordance with the present invention, the upper crate being designed to receive a smaller number of bigger bottles.

While I have disclosed several embodiments of the present invention, it is to be understood that these embodiments are given by example only and not in a limiting sense, the scope of the present invention being determined by the objects and the claims.

I claim:

1. A one-piece molded plastic bottle transport crate, comprising a rigid upper frame, a rigid bottom frame disposed below and spaced apart from said rigid upper frame, side walls forming corner portions rounded on the outside and rigidly conecting and spacing said frames, integral partition means disposed inside of said crate and consisting of longitudinal and transverse walls at a predetermined distance from each other, said partition means being adapted to secure the bottles in their position, said bottom frame including a grid of bars forming the crate bottom, said bars intersecting each other substantially perpendicularly and supporting said partition means, said longitudinal and transverse walls of said partition means being cut-away near the points of intersection forming downwardly directed cut-outs, at least some of said longitudinal and transverse walls extending downwardly to and attached integrally to said bottom grid, said longitudinal and transverse wall parts being connected with each other only at the area in which they are raised, said corner portions of said side walls comprise corner supports and intermediate portions of said walls are disposed in the lower part of said crate between each pair of corner supports, and said corner supports have at least one reinforcing rib projecting outwardly therefrom, said reinforcing rib is curved on its outside, the curved line following substantially to the load line resulting from the load of crates superposed on a bottom crate.

2. A one-piece molded plastic bottle transport crate, comprising a rigid upper frame, a rigid bottom frame disposed below and spaced apart from said rigid upper frame, said walls forming corner portions rounded on the outside and rigidly connecting and spacing said frames, integral partition means disposed inside of said crate and consisting of longitudinal and transverse walls at a predetermined distance from each other, said partition means being adapted to secure the bottles in their position, said bottom frame including a grid of bars forming the crate bottom, said bars intersecting each other substantially perpendicularly and supporting said partition means, said longitudinal and transverse walls of said partition means being cut-away near the points of intersection forming downwardly directed cut-outs, at least some of said longitudinal and transverse walls extending downwardly to and attached integrally to said bottom grid, said longitudinal and transverse wall parts being connected with each other only at the area in which they are raised, said crate has above said partition means an upper portion of an inner width greater than that of the lower portion thereof, and guiding faces are disposed between said upper portion and said lower portion and directed towards said partition means.

3. The transport crate, as set forth in claim 2, which includes
- a flange means projecting outwardly from and about said side walls of said crate at a level substantially coinciding with the upper end of said partition means, and
- said upper portion of greater width extending upwardly from said flange means.

References Cited

UNITED STATES PATENTS

| | | | |
|---|---|---|---|
| 1,747,408 | 2/1930 | Warren | 220—97 |
| 2,293,893 | 8/1942 | Faulkner | 220—21 |
| 2,667,284 | 1/1954 | Hoch | 220—21 |
| 2,758,742 | 8/1956 | Farrell. | |
| 2,830,729 | 4/1958 | Brackett. | |
| 3,002,650 | 10/1961 | Lovell. | |
| 3,107,026 | 10/1963 | DeChelbor | 220—21 |

FOREIGN PATENTS

| | | |
|---|---|---|
| 1,255,160 | 1/1961 | France. |
| 561,151 | 4/1957 | Italy. |

THERON E. CONDON, *Primary Examiner.*

G. E. LOWRANCE, *Assistant Examiner.*

UNITED STATES PATENT OFFICE
CERTIFICATE OF CORRECTION

Patent No. 3,380,616                                         April 30, 1968

Alexander Schoeller

It is certified that error appears in the above identified patent and that said Letters Patent are hereby corrected as shown below:

In the heading to the printed specification, between lines 4 and 5, insert -- Claims priority, application Germany, Oct. 24, 1962, Sch 32,491; Sch 32,494; Sch 32,495 --.

Signed and sealed this 24th day of February 1970.

(SEAL)
Attest:

Edward M. Fletcher, Jr.                                WILLIAM E. SCHUYLER, JR.
Attesting Officer                                               Commissioner of Patents